May 30, 1933.  C. L. KENNEDY  1,912,338
INDUCTION MOTOR
Filed Nov. 8, 1930
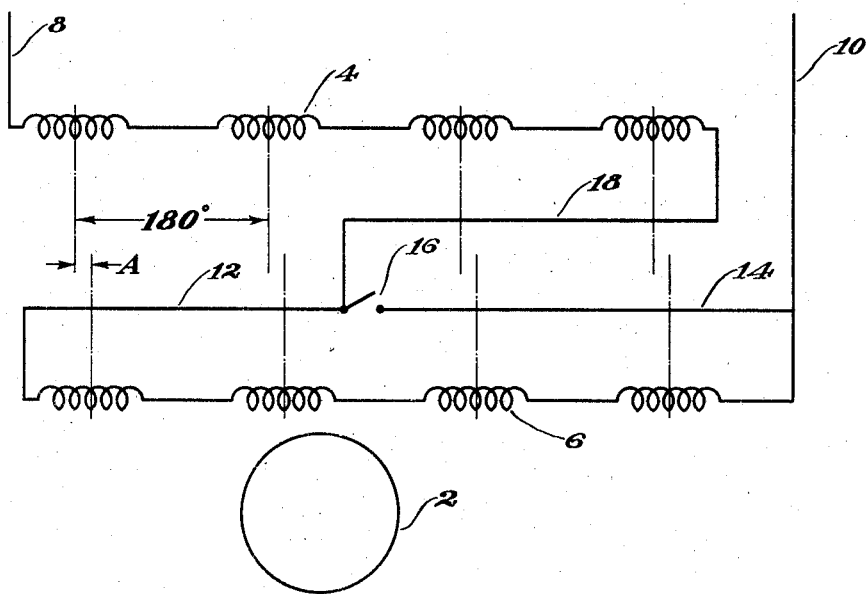
Witness
Paul F. Bryant
Inventor
Carlton L. Kennedy
by his attorneys Patented May 30, 1933

1,912,338

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

INDUCTION MOTOR

Application filed November 8, 1930. Serial No. 494,385.

The present invention relates to induction motors and more particularly to single phase induction motors.

The usual split phase motor comprises a main or working winding and an auxiliary or starting winding which is displaced from the main winding by a considerable angle. At starting, both windings are energized from the line and when the motor is brought up to speed, the starting winding may be cut out by an automatic switch. Inasmuch as the auxiliary winding is used only during starting, it contributes nothing to running operation.

The object of the present invention is to provide a simple and inexpensive single phase induction motor with provision for maximum economy, both in construction and operation.

With this object in view, the principal feature of the invention comprises an induction motor having two windings which are displaced in space sufficiently to produce a satisfactory cross field for starting, together with means for connecting the windings to carry the same current, whereby both contribute to the operation under running conditions.

The accompanying drawing is a diagram of the preferred form of induction motor according to the present invention.

The illustrated embodiment of the invention comprises a rotor 2, a stator winding 4, and a second stator winding 6, which latter may be termed a starting winding because of its connection to carry a current out of phase, both in time and space from that in the winding 4, although as will be pointed out, it is so constructed as to be actually employed as a main winding under running conditions. The winding 4 is wound in the usual manner to form poles, the positions of which for a four-pole motor are shown by dot-and-dash lines in the drawing. The winding 6 is similarly wound to form an equal number of poles which, however, are displaced by the angle A from corresponding poles of the winding 4. The line leads 8 and 10 are connected respectively to one end of the winding 4 and the opposite end of the winding 6. The winding 6 is included in a starting circuit which is adapted to be closed on itself by means of connections 12 and 14. The connection 14 includes a switch 16, of a suitable type adapted to remain closed during the starting period and to be opened when the motor comes up to speed. The winding 4 is included in a main circuit which has a wire 18 running from the end of the main winding to the wire 12. Each winding therefore has one end connected to a line lead; the opposite ends of the windings are connected together by the wires 18 and 12.

The windings 4 and 6 are constructed with different time constants, that is, with different ratios of resistance to reactance.

At starting, the switch arm 16 is closed, the main winding 4 being then connected directly between the lines 8 and 10 and the starting winding 6 being closed on itself. The starting winding 6 is energized by transformer action due to the inductive relation between the windings 4 and 6. The starting torque produced is dependent upon the space displacement A between the windings and also on the differences between their time constants. With a very small space displacement, the energy transferred to the winding 6 by transformer action will be large but the starting torque is not necessarily high because only a small cross field is produced. If the displacement is increased, the cross field becomes more favorable except for the reduction in the voltage induced in the starting winding, which voltage varies as the cosine of the angle of displacement. At a displacement of 90°, there is no induced voltage in the winding 6 and hence no starting torque. It will be seen, therefore, that a maximum starting torque exists for a displacement which is somewhat greater than zero and somewhat less than 90°. A relatively small displacement in the neighborhood of 15° has been found to produce a good starting torque, while permitting satisfactory series operation under running condition.

When the motor comes up to speed, the switch 14 is opened, thus opening the starting circuit. The complete circuit is now traced from the line 8, through the windings 4 and 6 in series to the line 10. Both windings are now energized by the same current.

The motor therefore operates under running conditions as an ordinary single phase motor under the combined effect of the two windings. It will be noted that the poles, due to the combined effect of the two windings, will be displaced to positions intermediate to the poles of the separate windings.

Although the windings 4 and 6 are displaced in space phase and although they have different time constants, these differences are not great enough to introduce any difficulties into the series operation under running condition. The difference in time constants may be effected in any suitable manner. In one form of the invention, the windings are wound in identical fashion so that their reactances are approximately equal, but the main winding 4 is made up of larger wire than the winding 6 so that it has slightly less resistance. The size of the wire in the winding 6 is such as to carry full load current indefinitely and the size of the wire in the winding 4 is sufficiently larger so that it will safely carry the comparatively high starting current for the short starting period. It will be noted that during starting, the entire power is delivered to the motor through the winding 4, so that the increase of wire size serves the double purpose of permitting the winding 4 to carry its starting load and also of varying the time constants sufficiently to give a high starting torque. Another mode of varying the time constants, which permits use of the same size throughout, is by using different numbers of turns in the two windings, since the resistance and reactance of a winding do not vary in the same proportion as the number of turns is varied.

The motor of the present invention may be constructed inexpensively because the windings 4 and 6 may both be designed as load carrying windings which are maintained in operation under all conditions. The slight space displacement is sufficient for starting torque without appreciably diminishing the effectiveness of either winding under running conditions. For example, with windings of the same number of turns displaced 15 electrical degrees from each other, the displacement of each of the windings with respect to the pole is only 7.5°. The effect of this of this small displacement is negligible; and the windings operate on the running connection with practically the same effectiveness as a single winding.

Having thus described the invention, what is claimed is:

An induction motor having, in combination, a main stator winding and an auxiliary stator winding, each having all of its coils in series, the windings being displaced in space and having different time constants, a line lead connected to one end of the main winding, a series connection between the windings, a line lead connected to the end of the starting winding, a single short-circuiting connection between said last-named line lead and said series connection, and a switch in the short-circuiting connection to permit energization of the starting winding by induction when the switch is closed and to permit series connection of the windings between the line leads when the switch is open.

In testimony whereof I have signed my name to this specification.

CARLTON L. KENNEDY.